W. W. HOPKINS.
CALCULATING MACHINE.
APPLICATION FILED JULY 31, 1909.

1,153,386.

Patented Sept. 14, 1915.
7 SHEETS—SHEET 1.

WITNESSES:

INVENTOR:
W. W. HOPKINS.
BY
ATTY.

W. W. HOPKINS.
CALCULATING MACHINE.
APPLICATION FILED JULY 31, 1909.

1,153,386.

Patented Sept. 14, 1915.
7 SHEETS—SHEET 2.

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION.

CALCULATING-MACHINE.

1,153,386. Specification of Letters Patent. Patented Sept. 14, 1915.

Application filed July 31, 1909. Serial No. 510,618.

*To all whom it may concern:*

Be it known that I, WILLIAM W. HOPKINS, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

This invention relates to a new improvement in calculating machines of that type illustrated in Belgian Patent No. 202,081 dated August 21, 1907 and also in application Serial No. 310,739 filed by Hubert Hopkins in United States Patent Office on or about April 9, 1906.

The construction and operation of the traveling carriage and its setting-up pins resembles somewhat the traveling carriage disclosed in a companion application filed by me April 9, 1909, No. 488,883, and I therefore do not in this present application claim the construction disclosed in the accompanying application.

My present invention involves an adding and listing machine, combined with a typewriting mechanism, the object being to construct such a machine in a simple manner employing a few number of parts, particularly in the adding machine department.

Another object is to provide an adding machine of the "ten key" type with multiple zero mechanism.

I make no claim in this application for any feature of improvement of typewriting mechanism.

I have omitted in this application the multiplying, subtracting and decimal devices in use upon the "Moon-Hopkins billing machine" by which the machine of said Hopkins Belgian patent aforesaid is commercially known. It is obvious, however, that these features can be added to the machine shown in the accompanying drawing if desired.

I am aware of the patent to Victor Stroh, No. 829,357 dated August 21, 1906, which illustrates and describes a multiple zero mechanism for ten key adding machines, but my present improvement differs essentially from said Stroh arrangement as will hereinafter more fully appear.

In the drawings 1 indicates the base of the machine; 2 are typewriter keys; 3 is the space key for the typewriter; 4 the platen on which the paper is supported, the printing type of the typewriting mechanism and of the adding mechanism making printing impressions thereon.

5 are the digit keys of the adding machine upon the ends of key bars 6 pivoted at 7. The rear ends of these keys pass under a bar 8 carried by arms 9 mounted upon rock shaft 10 arranged in bearings on the base of the machine. Whenever any of the digit keys in group A is depressed the bar 8 is lifted and the shaft 10 rocked. Shaft 10 carries an escapement lever 11, said lever supporting a spring pressed escapement pallet 12 and a fixed tooth 13, which coöperates with teeth on the escapement segment 14 mounted on a vertical shaft 15. This escapement mechanism is fully set forth in the Belgian patent, but in the present case, the escapement lever 11 is loosely mounted on shaft 10 and may be raised independently by the multiple zero mechanism to be hereinafter described.

Shaft 10 carries a fixed lever $11^a$ which is provided with a pin or projection $11^b$ extending under the lower edge of lever 11. Thus, when the shaft 10 is rocked the escapement lever 11 is vibrated, but said escapement lever may be vibrated independently. A spring 11ᶜ connected to escapement lever 11 tends to depress same and normally hold it in its depressed position.

Pin 11ᵇ is normally below the edge of lever 11 so that when any key in group A is operated, the escapement lever will not be lifted until the key approaches the lower limit of its depression. This enables the other parts under control of the operated key to be positioned by said key before the escapement mechanism permits the traveling carriage to move leftward one space.

Figure 3:
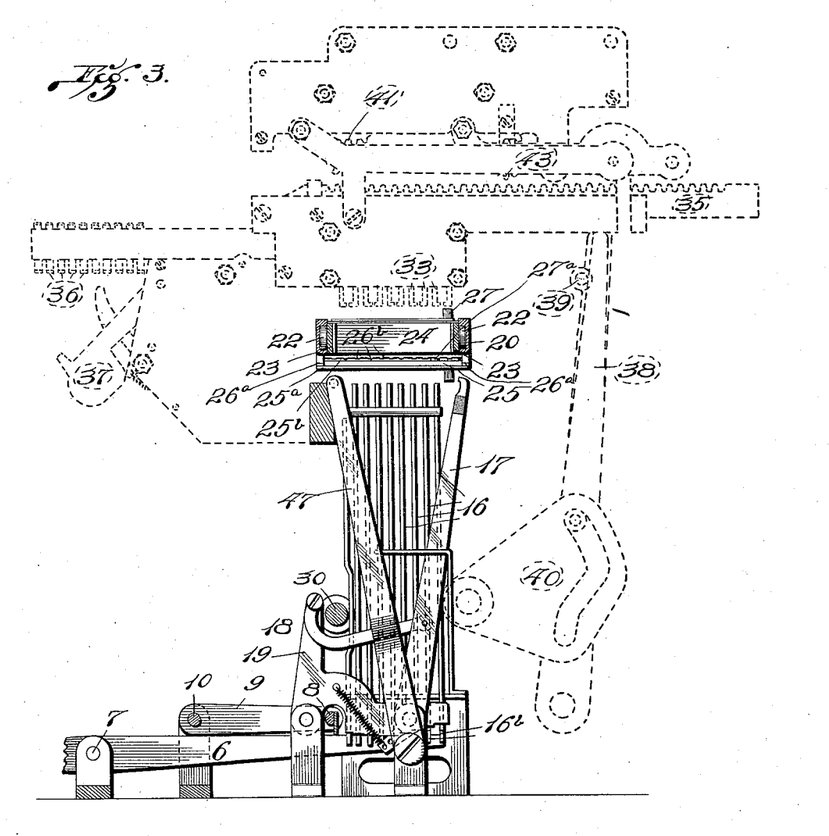
Fig. 3 is a vertical sectional view through the rear of the machine.
Figure 4:
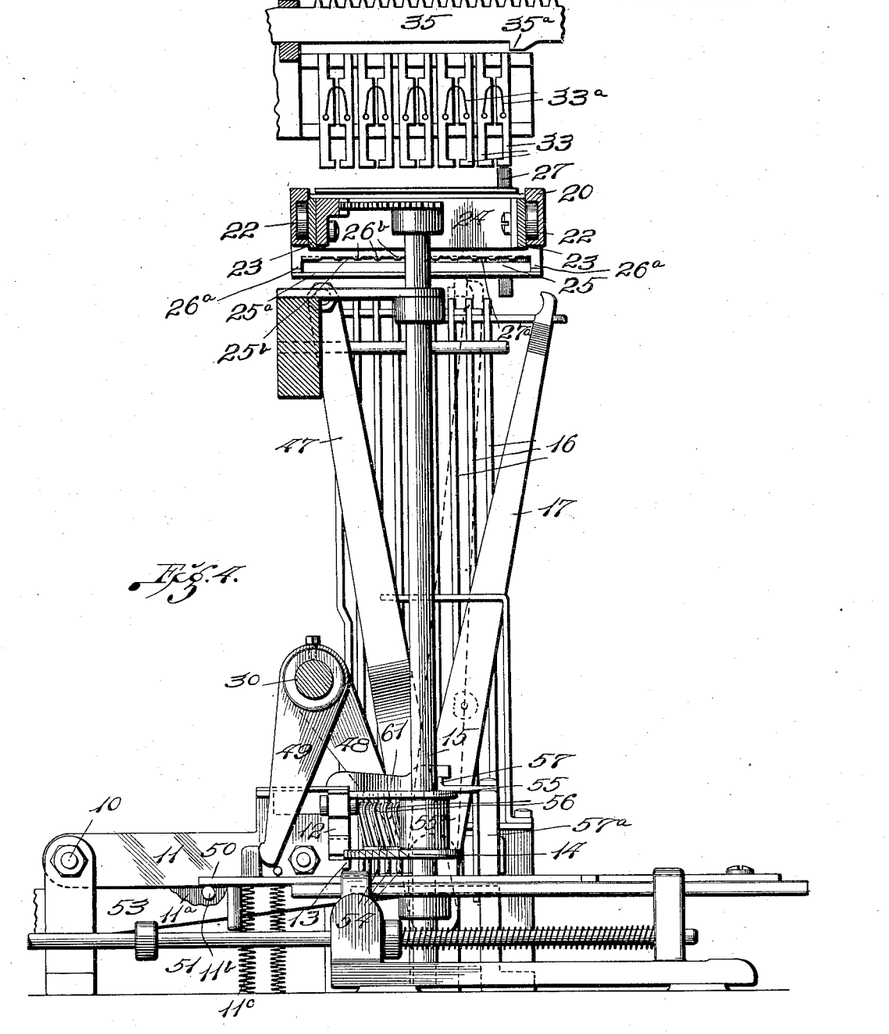
Fig. 4 is an enlarged side elevational view of certain of the parts located at the rear of the machine.
Figure 5:
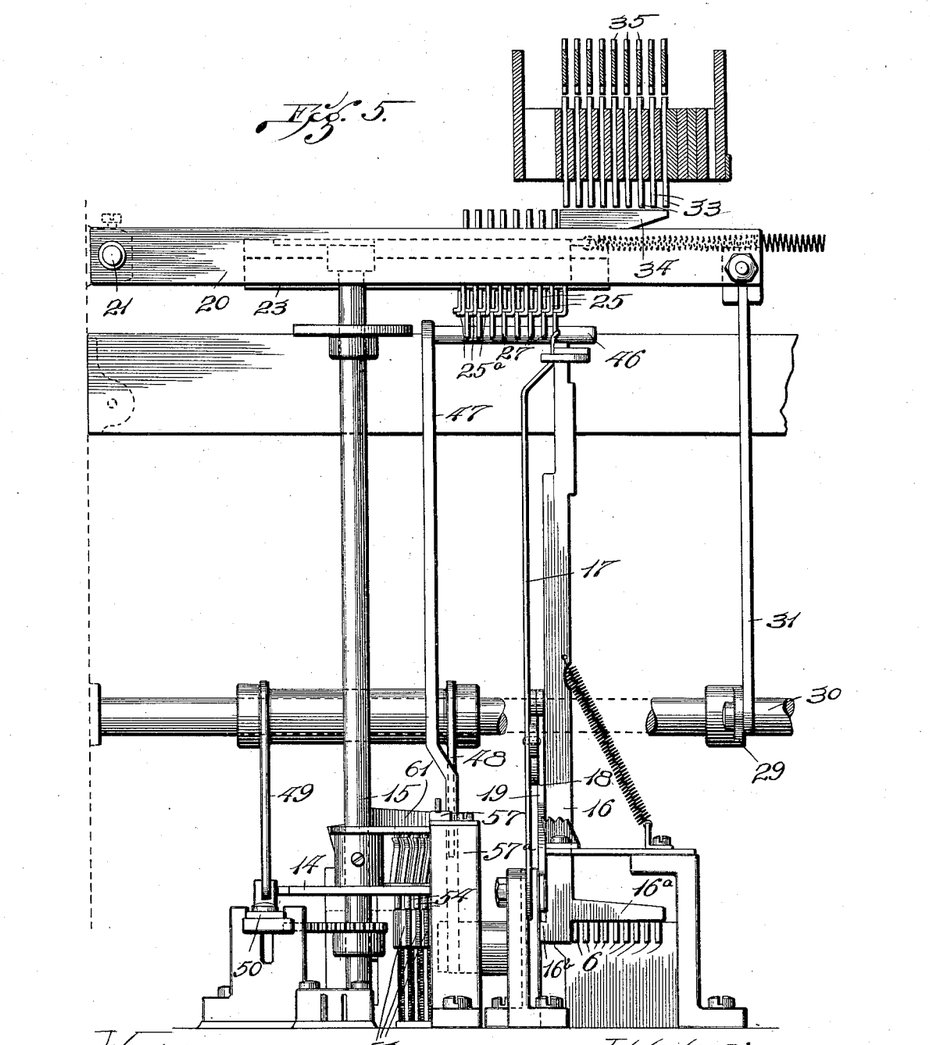
Fig. 5 is a rear elevational view of the parts shown in Fig. 4.
Figure 6:
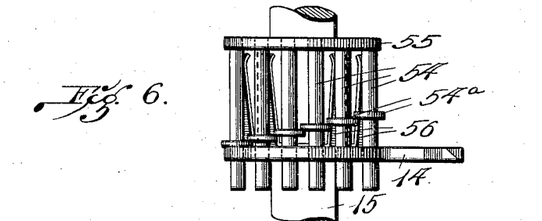
Fig. 6 is a detailed elevational view of part of the multiple zero mechanism.

16 represents a series of liftable stop bars each of which is provided with a foot 16ᵃ resting upon the rear end of its controlling key bar. The key bars are of different lengths and the feet of the liftable stop bars are also a different length, as shown in Fig. 6, so that when a key bar is operated its complementary stop bar will be lifted without interfering with any of the other stop bars. The upper ends of these stop bars 16 are arranged in longitudinal alinement as shown in Figs. 3 and 4 and constitute a longitudinal series of liftable stops, whose function is to arrest the horizontally movable stop pins when they are moved in the traveling carriage by the push bar or lever 17, see Fig. 3. This push lever is connected by a link 18 to a bell crank lever 19, whose lower horizontal member may be stepped at its rear lower edge, as shown, to coöperate with shoulders 16ᵇ on the lower ends of the lifting bars 16, see Fig. 5. Thus when a key is depressed the shoulder 16ᵇ vibrates the bell crank lever 19 and moves the push lever 17 forwardly a distance commensurate with the value of the operated key. There is no "zero" lifting bar, and the "9" lifting bar is shortened so as not to coöperate, at its upper end, with a setting-up pin, said pin being positioned in the "9" position by the extremity of the slot in which it is mounted.

Figure 14:
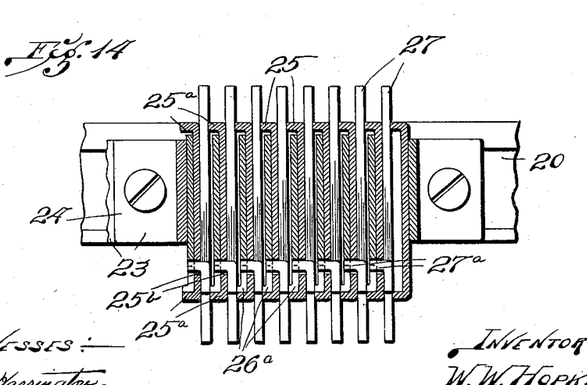
Fig. 14 is a sectional view on line 14—14, Fig. 10.

20 is a frame pivotally mounted upon the side framing of the machine by means of a rod 21. The side members of this frame are in form of channels, see Fig. 11, in which are arranged rollers 22, upon the traveling carriage side frames 23. These carriage frames are connected together by members 24, between which are arranged spacing plates 25. These spacing plates are provided with flanges 25ᵃ at their upper and lower edges, see Fig. 14, and are also formed with a horizontally disposed slot 25ᵇ.

Figures 10, 11, 12, 13:
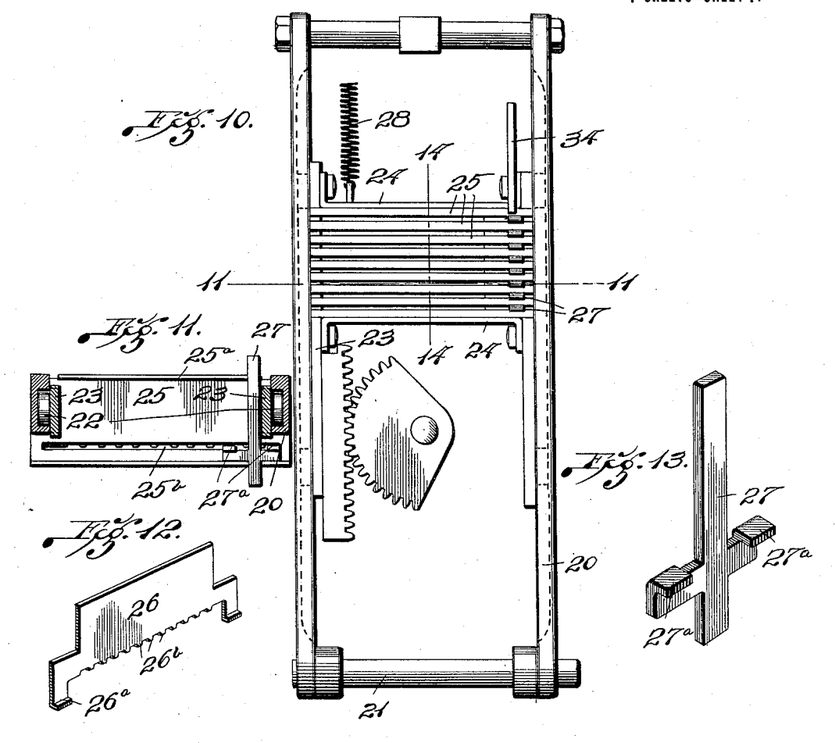
Fig. 10 is a plan view of the traveling carriage.
Fig. 11 is a sectional view on line 11—11, Fig. 10.
Fig. 12 is a detailed view of one of the plates for holding the setting-up pins in position.
Fig. 13 is a detailed view of one of the setting-up pins.

26 indicates a holding plate arranged in the channel of the spacing plate 25, said holding plate having legs 26 at each end by which it is supported in position. Teeth 26ᵇ on the lower edge of said plate project slightly below the upper edge of slot 25ᵇ as shown in Fig. 11. This holding plate 26 has a slight vertical movement, as when displaced by the movement of the setting-up pin.

27 indicates a setting-up pin, see Fig. 13, said pin having lateral wings or arms forming an inverted cross, and from which arms extend guiding and supporting projections 27ᵃ extending into the slot 25ᵇ and arranged under the notched edge 26ᵇ of the holding plate. The normal position of these setting-up pins is to the rear, as shown in Fig. 11, the first pin at the left hand end of the series looking from the front of the machine, or at the right hand end of the series looking from the rear of the machine, as shown in Fig. 5, being in the path of movement of the push lever 16 and in whose path is also located the liftable stop bars. Thus, whenever a key is depressed, the push lever moves the stop pin 27 in its path forwardly until it is arrested by stop bar 16, which is coincidentally lifted in front thereof. As before described, the depression of a key also operates the escapement mechanism as it approaches the low limit of its movement, and after the setting up pin has been positioned, but the carriage does not step leftwardly, because the spring pallet, when the key is depressed, is released and the escapement segment is under control of the fixed tooth 13. When the key rises to permit the restoration of the several parts, the fixed tooth moves downward away from the escapement tooth and permits the carriage to move leftward one step when the key bar is approaching its normal position.

Each of the stop bars 16 is preferably provided with a spring 16ᶜ to assist gravity in restoring said bars to their normal position. These springs also restore the key bars to normal position.

The shaft 15 on which the escapement wheel 14 is mounted is provided with a segmental gear 15ᵃ at its upper end which meshes with rack 23ᵃ on the side frame of the carriage. A spring 28, connected to the carriage, tends to move the same leftward when permitted to do so by the escapement mechanism.

When the push lever moves the setting-up pin 27 forwardly, the projections 27ᵃ lift the holding plate 26 by passing under the inclined edges of the notches in the lower edge thereof, and when said setting-up pins reach their intended position, and the stop bar and push bar recede therefrom, the notches in the lower edge of holding plate 26 engage 27ᵃ and prevent the setting-up pin from being accidentally displaced.

The keys are successively depressed to set up an item in the machine by moving the setting-up pins to different forward positions, and causing the carriage to move leftwardly as many steps as there are figures in the item to be introduced into the machine. Thus the item to be introduced into the machine may be said to be represented by the position of the setting-up pins in the traveling carriage.

Figure 1:
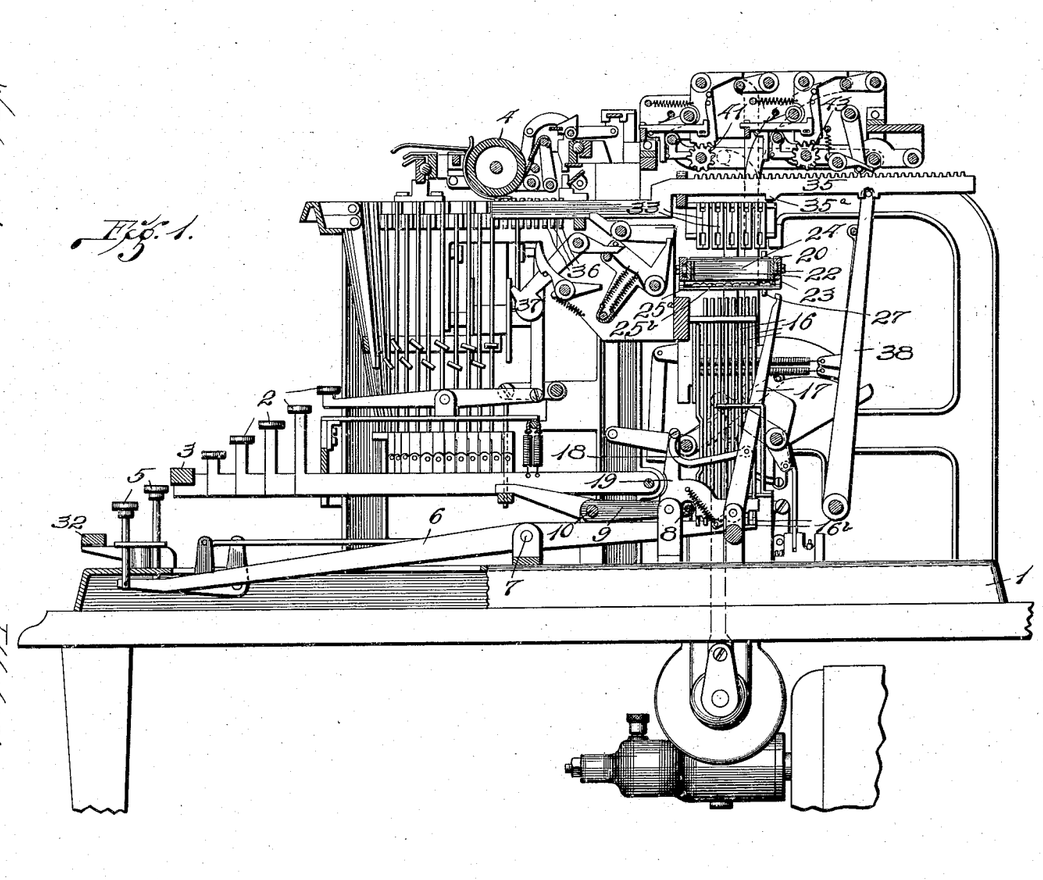
Figure 1 is a sectional view through my improved calculating machine.
Figure 2:
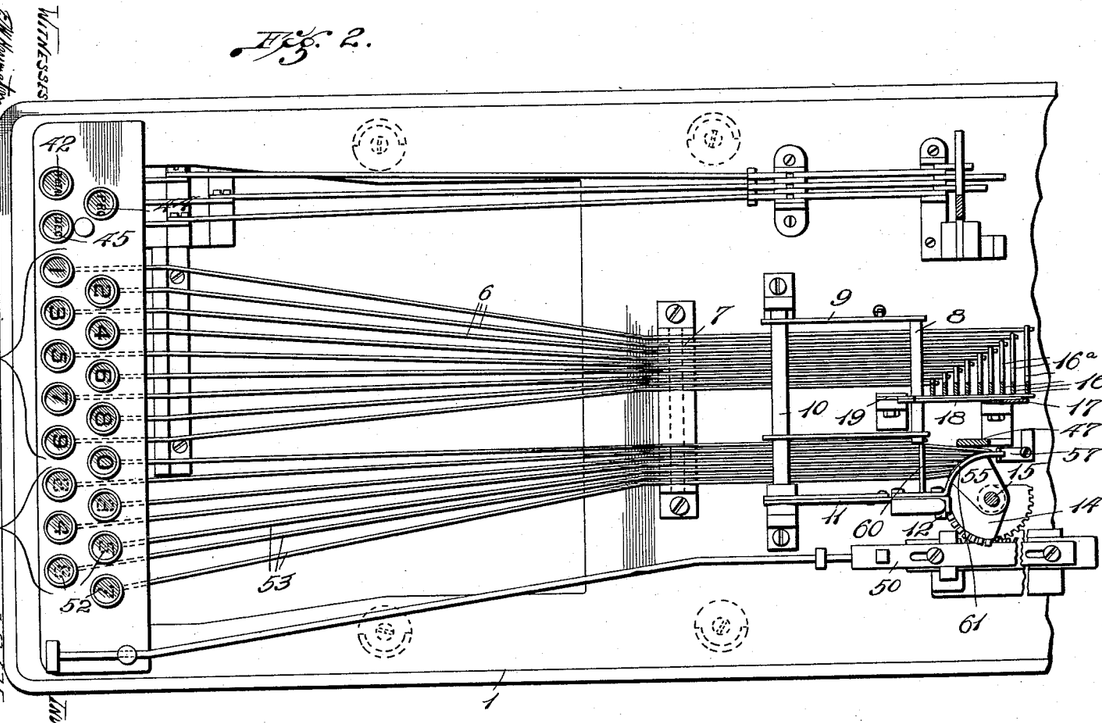
Fig. 2 is a plan view of the keyboard.

Means are provided to introduce the number so represented in the traveling carriage into a field of stop pins in a manner similar to that disclosed in said Belgian patent and this consists, as in said Belgian patent, of a rock arm 29 on one of the shafts 30 of the machine which rock arm is connected by a link 31 to the free end of frame 22. Whenever the power shaft is operated, as by pulling the operating handle of the machine (not shown) or by pressing the motor key 32, shown in Fig. 1, the carriage and its positioned setting-up pins are bodily lifted so as to raise the stop pins 33 into the paths of shoulders on the rack bars. These stop pins 33 are connected together in pairs by U-shaped springs 33$^a$, which springs tend to hold them elevated or depressed, as the case may be. When the carriage and its setting up pins are lifted, the item represented by the setting up pins is correspondingly represented in the field of stop pins 33.

34 indicates a plate on the traveling carriage which lies under all of the zero stop pins to the left of a positioned setting-up pin, and when the carriage is lifted, this plate raises the zero stop pins 33 under its control so as to prevent movement of idle rack bars not to be actuated in the introduction of the item into the totalizer wheels.

35 represents the rack bars which carry printing type 36 at their forward ends, said printing type being caused to make printing impressions by means of printing hammers 37 as described in said Belgian patent. These rack bars are provided with shoulders 35$^a$ to coöperate with the stop pins 33.

The plural sets of totalizers and their carrying mechanisms respectively, the means for actuating the rack bars and for causing one or both sets of totalizers to be thrown into mesh therewith, the means for introducing an item into a selected totalizer or to take a total therefrom, or transfer a number from one totalizer to another, making a record of such transactions by means of the printing mechanism are fully described in the Belgian patent and will not be described in detail here. They, however, are valuable adjuncts to a machine of a type illustrated in the accompanying drawings and I prefer that they be employed, although some of them may be omitted if desired.

The levers for operating the rack are shown at 38, and these are restored by a bar 39 under the control of a slot in cam 40, see Fig. 3. The total may be taken from the forward totalizer wheels 41 by means of the mechanism controlled by the total key, 42, and the total from the rear totalizer wheels 43 may be taken by mechanism controlled by the key 44 as stated in Belgian patent. There is also a decimal key 45 in the key board similar to the decimal key of the Belgian patent.

After an item has been introduced into the totalizer, the several parts are restored to normal position in readiness for the introduction of another item in a manner described in said Belgian patent. Special means are provided in my present construction for restoring the setting up pins, this means comprising a bar 46 which sweeps under the traveling carriage and engages lower ends of said pins moving them to their home position. This bar 46 is mounted in the end of a lever 47, said lever 47 being operated, as the handle moves rearwardly, by a rock arm 48 mounted on the shaft, 30. This shaft 30 carries an arm 49 which engages a sliding plate 50, (also under control of the error key bar 57) to restore the traveling carriage.

In the operation of ten key adding machines, if it is desired to introduce an item containing a number of zeros as for instance $20,000.00 the key 2 is first struck and then the zero key is depressed six times, placing six zeros successively in the thousands, hundreds, tens, units, dimes and cents columns. My invention contemplates the use of multiple zero keys, and in the instance under consideration after the "2" key is operated, the "6" multiple zero key will be operated so as to set up six zeros and save repeated operations of the single zero key.

Figure 9:
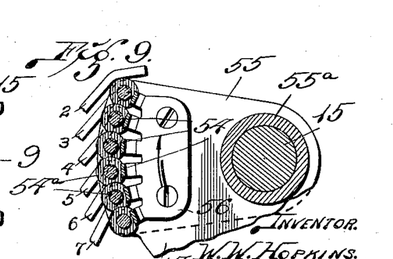
Fig. 9 is a horizontal sectional view on line 9—9, Fig. 8.

52 indicates multiple zero key in group B which key may be of a different color from keys in group A to distinguish them. Key bars 53 of these multiple zero keys are pivoted upon the same pivot rod 7 upon which the key bars of the digit keys are mounted. The ends of these key bars 50 are nested so as to be located under pins 54 mounted in flanges 55 extending from sleeve 55$^a$ fixed to the escapement segment 14. These pins coöperate with individual friction springs 56 which hold them in any adjusted position. These pins are also provided with flanges 54$^a$ which overlap each other as shown in Fig. 6, so that when any one of said pins is raised it will carry with it all of the remaining pins to the rear thereof, with respect to the direction of movement of the escapement segment, in the introduction of an item into the machine which movement is indicated by an arrow in Figs. 7 and 9.

Figure 7:
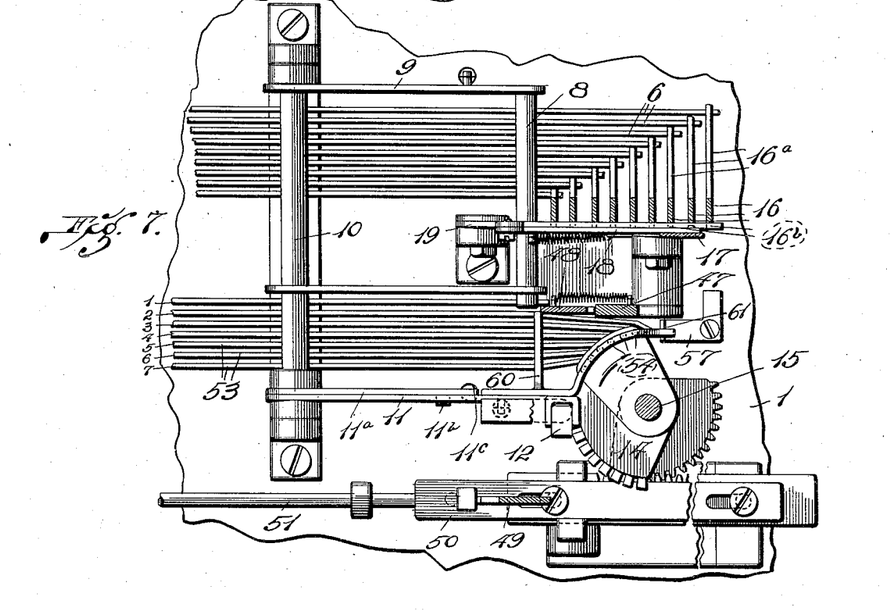
Fig. 7 is a top plan view of the parts shown in Fig. 5.
Figure 8:
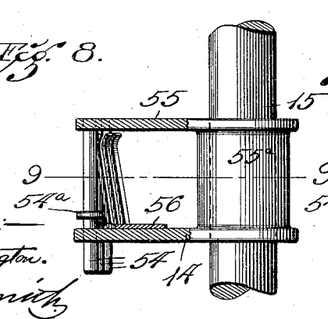
Fig. 8 is a sectional view of part of the multiple zero mechanism.

The rear end of the single zero key in group A terminates under the rod 8, but has nothing to do with the mechanism controlled by the multiple keys. The rear end of the multiple key bar 53 identified with the "2" key terminates one step in advance of the foremost pin when the parts are in normal position, as shown in Fig. 7; the rear end of the key bar identified with the "3" key terminates under the first or advance pin 54, the bar 4 under the second pin, and so on through the entire series, with the "7" multiple key terminating under the next to the last pin. To make the multiple zero mechanism effective, one of the digit keys in group A must first be operated. I do not mean by this that the multiple zero mechanism would be inoperative unless the digit key was first depressed, but that said mechanism would be ineffective. The operation of a digit key advances the escapement segment one step in the direction of the arrow so as to place the first pin over the rear end of the key bar of the "2" multiple zero key, and so on. When the escapement segment progresses in the direction of the arrow, as for instance in introducing $1200.00 the depression of the "1" and "2" digit keys would place the foremost pin 54 out of control of the multiple zero key bars, but the remainder would be under control of said multiple zero keys. If now the "4" multiple zero key is operated, it would raise the fourth pin, and with it the remaining pins to the rear thereof, placing the pin directly over the operated multiple zero key bar in position to strike a fixed stop 57 mounted upon the upper end of the post 57ª extending up from the base of the machine. The parts are so proportioned that the pin that strikes the stop plate 57 arrests the escapement wheel one tooth short of the desired amount of movement. This is necessary in the construction shown, because the depression of a multiple zero key in operating the escapement mechanism is similar to the depression of one of the digit keys, that is, it raises the escapement bar 11 permitting the pallet 12 to take a position which will permit the escapement wheel to advance one step when the key rises. Thus, in the example under consideration, the depression of the "4" multiple zero key only permits the escapement segment under the impelling action of the spring connected to the traveling carriage to move leftwardly a distance of three steps, the fourth step being taken when the key is permitted to rise.

The purpose of raising all of the pins behind the one directly operated is to prevent said pins from interfering with the rear end of the operated multiple key bar, which lies in their path of movement. Thus, when the rear end of multiple key bar is raised to operate a pin, the free movement of the escapement wheel segment would be interfered with by the lower ends of the pins to the rear of the one operted.

Means are provided for lifting the escapement lever 11 so that the fixed tooth 13 thereof may be raised out of engagement with the escapement teeth. This means consists of a bar or projection 60 extending from a plate secured to lever 11 and lying over the ends of the multiple zero key bars. Whenever a multiple zero key bar is operated, lever 11 is raised so as to lift the escapement lever 11 and raise the fixed tooth 13 past the teeth, thus releasing the escapement segment from all restraint and permitting its rotation until arrested by the foremost pin coming in contact with the stop 57. The plate, from which projection 60 is bent, extends over the pins 54 in a curved line, as shown in Fig. 7, said extension being marked 61. When lever 11 is raised, this curved extension is likewise lifted and does not interfere in any way with the elevation of pins 54. After the escapement segment is released and the pins arrest said segment to position the traveling carriage leftward a distance of two or more spaces, depending upon the number of zeros to be introduced into the item, the restoration of lever 11 will cause the curved extension 61 to restore all of the pins 54 by depressing them to their normal position.

In the Stroh patent, hereinbefore referred to, the multiple zero mechanism is operated to set up two or more zero stop pins in the traveling carriage as the carriage is moved laterally two or more spaces over the projection which lifts the zero stop pins into position. Thus the zero stop pins are positively actuated whenever the multiple zero key is depressed. This is not the case in my construction. The depression of a zero key merely effects the movement of the carriage two or more steps laterally, but the position of the setting-up pins is not disturbed. The horizontally movable setting-up pins in my construction normally lie in zero position, and, therefore, do not have to be moved to be placed in zero position and as said setting-up pins do not act as stop pins for the rack bars, it is obvious that by being permitted to remain in zero position they will lift the zero stop pins above them so that said field of stop pins will correctly represent the item introduced by the lifting movement imparted to the several pins, including the zero pin.

Having thus described my invention, what I claim is:

1. In a calculating machine, the combination of a totalizer, racks for actuating said totalizer, a stationary field of stops for controlling said racks, a traveling carriage and a series of vertically disposed horizontally adjustable setting-up pins arranged in said carriage.

2. In a calculating machine, the combination of a totalizer, actuating racks therefor, a field of stop pins for controlling the movement of said racks, a traveling carriage, a series of horizontally adjustable setting-up pins mounted in said carriage and means for lifting said setting-up pins to position the stop pins.

3. In a calculating machine, the combination of a traveling carriage, a series of horizontally adjustable setting-up pins arranged in said carriage, friction plates for holding said pins in adjusted positions, a push lever for adjusting said pins, and a stop bar for limiting the movement of said pins.

4. In a calculating machine, the combination of a traveling carriage having a series of longitudinally movable setting-up pins, friction plates for holding said pins in adjusted positions, an escapement mechanism for controlling the step by step movement of said carriage, a push lever for moving said setting-up pins as they are successively brought under its control, and a series of stop bars for arresting the setting-up pins in different positions.

5. In a calculating machine, the combination of a traveling carriage, a series of setting-up pins mounted in said carriage, friction plates for holding said pins in adjusted positions, an escapement mechanism for controlling the movement of said carriage and its setting-up pins, a series of digit keys, stop bars which are positioned by said keys respectively, and a push lever under control of all of said digit keys, the movement of said push lever being proportionate to the position of the stop bar arrested by the respective keys.

6. In a calculating machine, the combination of a traveling carriage, a series of horizontally movable setting-up pins, a stationary field of stop pins coöperating therewith, and means for holding said setting-up pins in their adjusted position against accidental displacement.

7. In a calculating machine, the combination of a traveling carriage, a series of horizontally movable setting-up pins mounted therein, said pins being held against vertical displacement relative to said carriage, individual means for frictionally holding said pins in their adjusted positions, and a stationary field of stop pins coöperating therewith.

8. The combination of a laterally movable carriage and its escapement mechanism, of a series of pins carried by the escapement, said pins coöperating with each other whereby the operation of any one pin will operate all the other pins to the rear thereof, and a series of key levers at least one of which is in control of said pins throughout their zone movement.

9. The combination of a laterally movable carriage and its escapement mechanism, of a series of stops carried by the escapement mechanism, the fixed stop with which any one of said series of stops, when operated, will engage to arrest the advancing movement of the escapement mechanism two or more spaces depending upon the stop which is operated, and a plurality of key levers in control of said stops, or certain of them throughout their entire zone of movement.

10. In a calculating machine, the combination with a field of stop pins, multiple zero keys any one of which is in control of two or more zero stops in said field, and a series of setting-up pins interposed between said multiple zero keys and said field of stops.

11. In a calculating machine, the combination of a traveling carriage and escapement mechanism in control thereof, a part movable with said carriage, a series of stop pins carried by said part, and multiple zero keys coöperating with said stop pins.

12. In a calculating machine, the combination of a traveling carriage, a part movable therewith, stop pins carried by said part, multiple zero keys in control of said stop pins, an escapement mechanism for said carriage, and means controlled by said multiple zero keys for rendering said escapement mechanism inoperative whenever any of said keys are operated.

13. In a calculating machine, the combination of a traveling carriage and its series of setting-up pins, a part movable with said carriage and containing a series of pins for arresting said carriage in different positions when released by its escapement mechanism, an escapement mechanism for said carriage, and a series of multiple zero keys in control of said escapement mechanism and said pins.

14. In a calculating machine, the combination of a traveling carriage, an escapement mechanism therefor, including an escapement segment, stop pins carried by said segment, a stationary stop with which said pins coöperate, connections between said pins whereby when any one pin of the series is lifted, all the other pins to the rear thereof are likewise lifted, and multiple zero keys in control of said pins and said escapement mechanism whereby whenever a multiple zero key is operated, escapement mechanism is moved out of control of said escapement mechanism.

15. In a calculating machine, the combination of a traveling carriage and its escapement mechanism, multiple zero keys and their associate parts which are in control of said carriage and its escapement mechanism, and means whereby said carriage is spaced laterally a distance short of the desired movement upon the depression of the multiple zero key, the release of said multiple zero key causing said carriage to move another space.

16. In a calculating machine, the combination of a stationary totalizer, racks for actuating said totalizer, a stationary field of stops for controlling said racks, a traveling carriage and a series of vertically disposed horizontally adjustable setting-up pins arranged in said carriage and movable transversely the direction of movement of said carriage.

17. In a calculating machine, the combination of a totalizer, actuating racks therefor, a stationary field of stop pins for controlling the movement of said racks, a traveling carriage, a series of setting-up pins movable transversely the direction of movement of said carriage, keys for successively positioning said setting-up pins, and means for lifting said setting-up pins to position the stop pins.

In testimony whereof I hereunto affix my signature in the presence of two witnesses, this 27th day of July, 1909.

WILLIAM W. HOPKINS.

Witnesses:
ALMA GEBHARD,
LENORE CLARK.

Copies of this patent may be obtained for five cents each, by addressing the "Commissioner of Patents, Washington, D. C."